United States Patent
Shim

(10) Patent No.: US 7,258,647 B2
(45) Date of Patent: *Aug. 21, 2007

(54) POWER TRAIN FOR 7-SPEED AUTOMATIC TRANSMISSION FOR VEHICLES

(75) Inventor: Hyu Tae Shim, Hwansung-si (KR)

(73) Assignee: Hyundai Motor Company, Seoul (KR)

( * ) Notice: Subject to any disclaimer, the term of this patent is extended or adjusted under 35 U.S.C. 154(b) by 124 days.

This patent is subject to a terminal disclaimer.

(21) Appl. No.: 11/022,230

(22) Filed: Dec. 23, 2004

(65) Prior Publication Data

US 2005/0202925 A1     Sep. 15, 2005

(30) Foreign Application Priority Data

Mar. 9, 2004   (KR) .................. 10-2004-0015707

(51) Int. Cl.
*F16H 3/62*   (2006.01)

(52) U.S. Cl. .............. 475/278; 475/275; 475/276; 475/285; 475/289; 475/330

(58) Field of Classification Search ............ 475/275, 475/276, 277, 278, 285, 289, 330
See application file for complete search history.

(56) References Cited

U.S. PATENT DOCUMENTS 6,773,370 B2 *   8/2004   Martyka et al. ............ 475/275
6,910,986 B2 *   6/2005   Wittkopp .................... 475/275
6,913,556 B2 *   7/2005   Armstrong et al. ......... 475/269
6,923,742 B2 *   8/2005   Armstrong et al. ......... 475/278
6,958,031 B2 * 10/2005   Diosi et al. ................. 475/276
6,997,845 B2 *   2/2006   Tiesler et al. ............... 475/278
7,025,703 B2 *   4/2006   Diosi et al. ................. 475/276
2005/0143214 A1 * 6/2005  Shim ........................... 475/285
2005/0192150 A1 * 9/2005  Shim ........................... 475/275

FOREIGN PATENT DOCUMENTS

JP          2004-053010          2/2004

* cited by examiner

*Primary Examiner*—David D. Le
(74) *Attorney, Agent, or Firm*—Morgan Lewis & Bockius LLP

(57) ABSTRACT

A power train of a 7-speed transmission for a vehicle is provided which comprises a first, a second, and a third single-pinion planetary gear set on an input shaft. A first ring gear and a second planetary carrier, a second ring gear and a third planetary carrier, a third ring gear and a first planetary carrier are respectively fixedly connected. A first brake selectively connects a first sun gear to a transmission case, a second sun gear is fixedly connected to the input shaft to operate always as an input element, and a third brake selectively connects a third sun gear to the transmission case.

4 Claims, 4 Drawing Sheets

FIG.2

| operating elements | clutch | | | brake | | | OWC | gear ratio |
|---|---|---|---|---|---|---|---|---|
| | C1 | C2 | C3 | B1 | B2 | B3 | | |
| shift speed | first speed |  |  |  | ● | ○ |  | ● | 4.829 |
| | second speed |  |  |  | ● |  | ● |  | 2.900 |
| | third speed |  | ● |  | ○ |  |  | ● | 2.139 |
| | fourth speed |  |  | ● | ● |  |  |  | 1.765 |
| | fifth speed | ● |  |  | ● |  |  |  | 1.352 |
| | sixth speed | ● |  | ● |  |  |  |  | 1.000 |
| | seventh speed | ● |  |  |  |  | ● |  | 0.750 |
| R |  |  | ● |  | ● |  |  | 3.000 |
| N, P |  |  |  |  | ● |  |  | 6.439 (1st/seventh speed) | ion of a Ravineaux-type

POWER TRAIN FOR 7-SPEED AUTOMATIC TRANSMISSION FOR VEHICLES

CROSS REFERENCE TO RELATED APPLICATIONS

This application claims priority to Korean Application No. 10-2004-0015707, filed on Mar. 9, 2004, the disclosure of which is incorporated herein by reference.

FIELD OF THE INVENTION

The present invention relates to a power train for a 7-speed automatic transmission for vehicles.

BACKGROUND OF THE INVENTION

Generally, vehicle companies develop different types of power trains for automatic transmissions for vehicles. A 4-speed or 5-speed automatic transmission is usually adopted, and a 6-speed automatic transmission has also been developed and applied to vehicles. Recently, efforts have been made to develop a 7-speed automatic transmission.

For example, by assembling a single-pinion planetary gear set and a Ravineaux-type compound planetary gear set through three clutches and three brakes, seven speeds can be realized. More concretely, a single-pinion planetary gear set is disposed in a rear portion of a compound planetary gear set. A first planetary carrier of the single-pinion planetary gear set is directly connected to an input shaft such that the first planetary carrier always acts as an input element. A first clutch connects a first ring gear and a third sun gear of the compound planetary gear set, and a second clutch connects the first ring gear and a second sun gear of the compound planetary gear set.

A third clutch, operating as a variable input element, connects the second and third planetary carriers of the compound planetary gear set to the input shaft. At the same time, the second and third planetary carriers of the compound planetary gear set are variably connected to a transmission case through a first brake to selectively operate as a reaction element. A third ring gear of the compound planetary gear set is connected to an output gear to operate as an output element.

In addition, the second and third planetary carriers of the compound planetary gear set are connected to the transmission case by a one way clutch OWC such that a rotation of the second and third planetary carriers can be prevented, and a second brake is disposed between the transmission case and the second sun gear of the compound planetary gear set so that the second sun gear of the compound planetary gear set can operate as a selective reaction element. A first sun gear of the single-pinion planetary gear set is connected to the transmission case by a third brake so that the first sun gear of the single-pinion planetary gear set can operate as a selective reaction element.

In the power train as described above, a first speed is achieved by operating the first clutch and the first and third brakes. A second speed is achieved by canceling the first brake from its operation in the first speed, and operating the second brake. A third speed is achieved by canceling the second brake from its operation in the second speed, and operating the second clutch. A fourth speed is achieved by canceling the second clutch from its operation in the third speed, and operating the third clutch. A fifth speed is achieved through canceling the third brake from its operation in the fourth speed, and operating the second clutch. A sixth speed is achieved by canceling the operation of the first clutch, and operating the third brake. A seventh speed is achieved by canceling the second clutch from its operation in the sixth speed, and operating the second brake. Finally, reverse achieved by operating the second clutch, and the first and third brakes.

Although such a power train realizes seven forward speeds and a reverse speed, its adoption of a Ravineaux-type compound planetary gear set that is very large in the radial direction results in drag torque, and involves many operating elements in shifting. Additionally, the endurance of the planetary gear set deteriorates, and productivity and design freedom cannot be effectively obtained.

SUMMARY OF THE INVENTION

The present invention provides power trains of a 7-speed automatic transmission formed through assembling single-pinion planetary gear sets, so that improved endurance, productivity, and design freedom can be obtained, and performance of the automatic transmission can be improved. A power train of a 7-speed transmission for a vehicle comprises a first, a second, and a third single-pinion planetary gear set on an input shaft. A first ring gear and a second planetary carrier, a second ring gear and a third planetary carrier, and a third ring gear and a first planetary carrier are respectively fixedly connected to each other. A first sun gear is selectively connected to a transmission case via a first brake, a second sun gear is fixedly connected to the input shaft as an input element, and a third sun gear is selectively connected to the transmission case via a third brake.

In another embodiment, a second planetary carrier is selectively connected to the input shaft via a first clutch, a third planetary carrier is selectively connected to a transmission case through a second brake and a one way clutch, and a third ring gear is connected to an output shaft. In a further embodiment, the third clutch and the second and third brakes are disposed in a front portion of the inside of the transmission case, and the first and second clutches and the first brake are disposed in a rear portion of the inside of the transmission case. In yet another embodiment, the one way clutch and the second brake may be disposed in parallel within the transmission case and while being connected to the third planetary carrier.

Finally, the first brake and the one way clutch may operate to achieve a first speed, the first brake and the third brake may operate to achieve a second speed, the second clutch and the one way clutch may operate to achieve a third speed, the third clutch and the first brake may operate to achieve a fourth speed, the first clutch and the first brake may operate to achieve a fifth speed, the first clutch and the third clutch may operate to achieve a sixth speed, the first clutch and the third brake may operate to achieve a seventh speed, and the third clutch and the second brake may operate to achieve a reverse speed.

BRIEF DESCRIPTION OF THE DRAWINGS

The accompanying drawings, which are incorporated in and constitute a part of the specification, illustrate an embodiment of the invention, and, together with the description, serve to explain the principles of the invention, where:

FIG. 2 is a table of operations of friction elements during shifting of the power train according to an embodiment of the present invention;

DETAILED DESCRIPTION OF THE EMBODIMENTS

Figure 1:
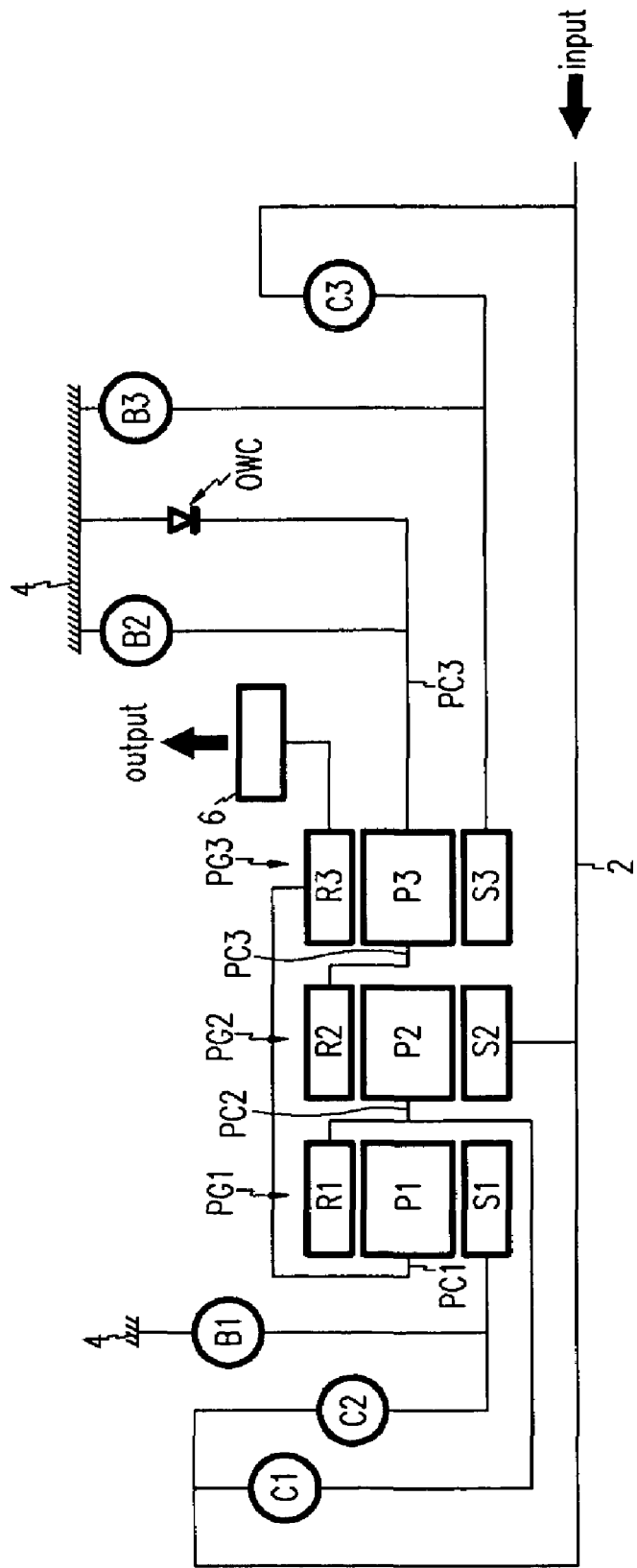
FIG. 1 is a block diagram of a power train according to an embodiment of the present invention.

FIG. 1 is a block diagram of a power train according to an embodiment of the present invention. The first, second, and third planetary gear sets, PG1, PG2, and PG3, respectively, are sequentially disposed from a rear side to a front side on an input shaft 2 that is connected to an output shaft (not shown) of an engine (not shown) through a torque converter (not shown). First planetary gear set PG1 is a single-pinion planetary gear set including a first sun gear S1, a first ring gear R1, and a first planetary carrier PC1 rotatably supporting a first planetary gear P1 that is meshed between first sun gear S1 and first ring gear R1. Second planetary gear set PG2 is a single-pinion planetary gear set including a second sun gear S2, a second ring gear R2, and a second planetary carrier PC2 rotatably supporting a second planetary gear P2 that is meshed between second sun gear S2 and second ring gear R2. Third planetary gear set PG3 is a single-pinion planetary gear set including a third sun gear S3, a third ring gear R3, and a third planetary carrier PC3 rotatably supporting a third planetary gear P3 that is meshed between third sun gear S3 and third ring gear R3.

As shown in FIG. 1, first, second, and third planetary gear sets PG1, PG2, and PG3 are sequentially disposed from the rear to the front of a transmission. Among these elements, first ring gear R1 and second planetary carrier PC2, second ring gear R2 and third planetary carrier PC3, and first planetary carrier PC1 and third ring gear R3 are respectively fixedly connected to each other.

Second sun gear S2 is fixedly connected to input shaft 2, and so second sun gear S2 always operates as an input element. Because first sun gear S1, third sun gear S3, and first ring gear R1 are respectively connected to input shaft 2 via a second clutch C2, a third clutch C3, and a first clutch C1, respectively, first sun gear S1, third sun gear S3, and first ring gear R1 also selectively operate as input elements.

First sun gear S1 and third sun gear S3 are connected to a transmission case 4 via a first brake B1 and a third brake B3, respectively. Therefore, first sun gear S1 and third sun gear S3 selectively operate as stationary elements. In addition, third planetary carrier PC3 is connected to transmission case 4 via a second brake B2 and a one way clutch OWC in parallel so that third planetary carrier PC3 operates as a variable stationary element. Third ring gear R3 is connected to an output gear 6 so that third ring gear R3 always operates as an output element.

In the above-stated arrangement, first and second clutches C1 and C2, and first brake B1, are positioned at the rear of the inside of transmission case 4, and third clutch C3 and second and third brakes B2 and B3 are positioned at the front of the inside of transmission case 4.

Referring now to the FIG. 2, a forward first speed is achieved by operating first brake B1 and one way clutch OWC. A forward second speed is achieved by operating first and third brakes B1 and B3. A forward third speed is achieved by operating second clutch C2 and one way clutch OWC. A forward fourth speed is achieved by operating third clutch C3 and first brake B1. A forward fifth speed is achieved by operating first clutch C1 and first brake B1. A forward sixth speed is achieved by operating first and third clutches C1 and C3. A forward seventh speed is achieved by operating first clutch C1 and third brake B3. A reverse speed is achieved by operating third clutch C3 and second brake B2. Therefore, seven forward speeds and one reverse speed is realized with the above described power train.

Figure 3:
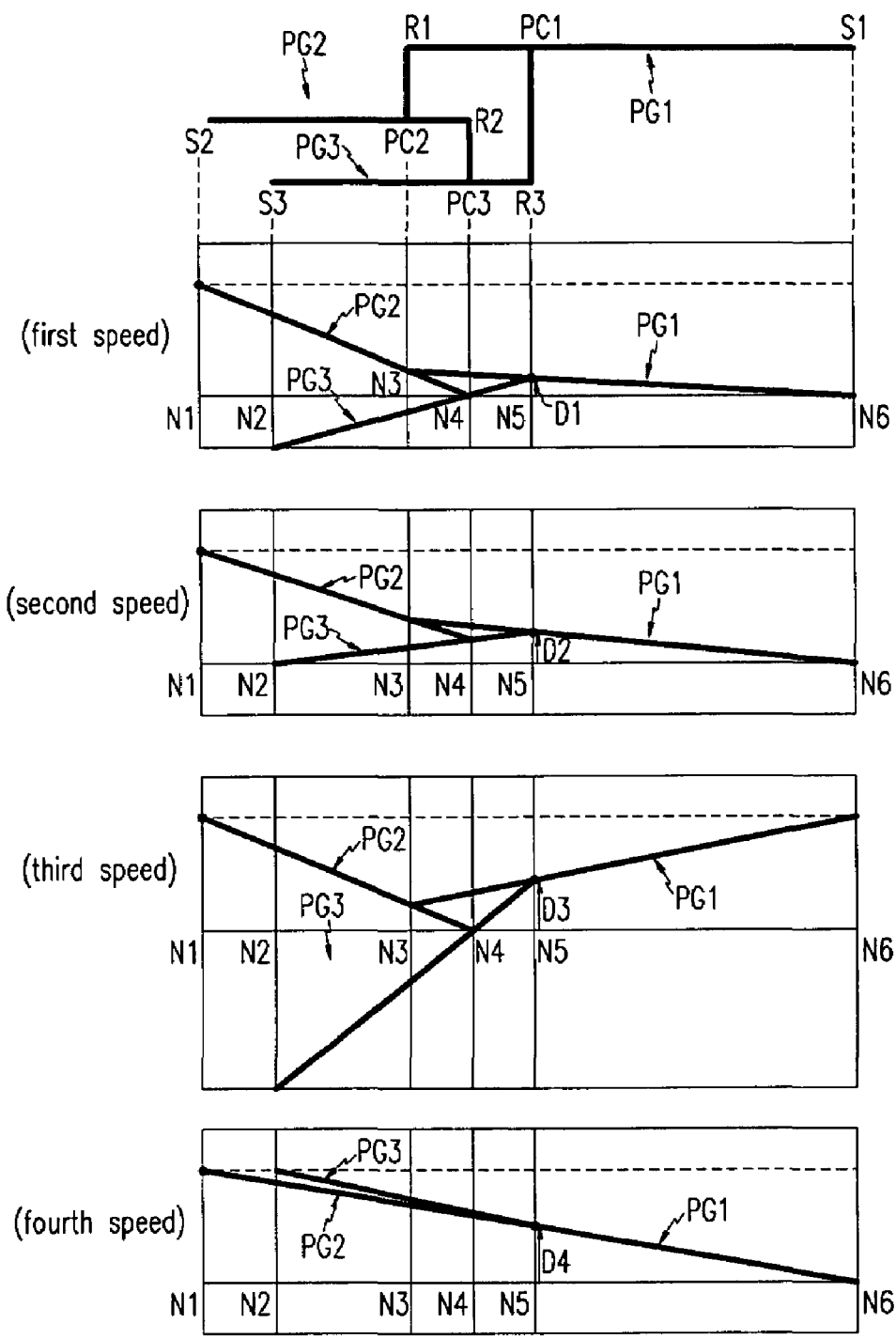
FIG. 3 is a speed diagram according to a lever analysis method for showing shifting processes from a first speed to a fourth speed in a power train according to an embodiment of the present invention.

In the power train according to the present invention, while assembling three single-pinion planetary gear sets, first ring gear R1 and second planetary carrier PC2, second ring gear R2 and third planetary carrier PC3, and third ring gear R3 and first planetary carrier PC1 are respectively fixedly connected to each other. Thus, as shown in FIG. 3, in the speed diagram of the lever analysis method, six nodes exist. A first node N1 corresponds to second sun gear S2. A second node N2 corresponds to third sun gear S3. A third node N3 corresponds to first ring gear R1 and second planetary carrier PC2. A fourth node N4 corresponds to second ring gear R2 and third planetary carrier PC3. A fifth node N5 corresponds to first planetary carrier PC1 and third ring gear R3. A sixth node N6 corresponds to first sun gear S1.

Figure 4:
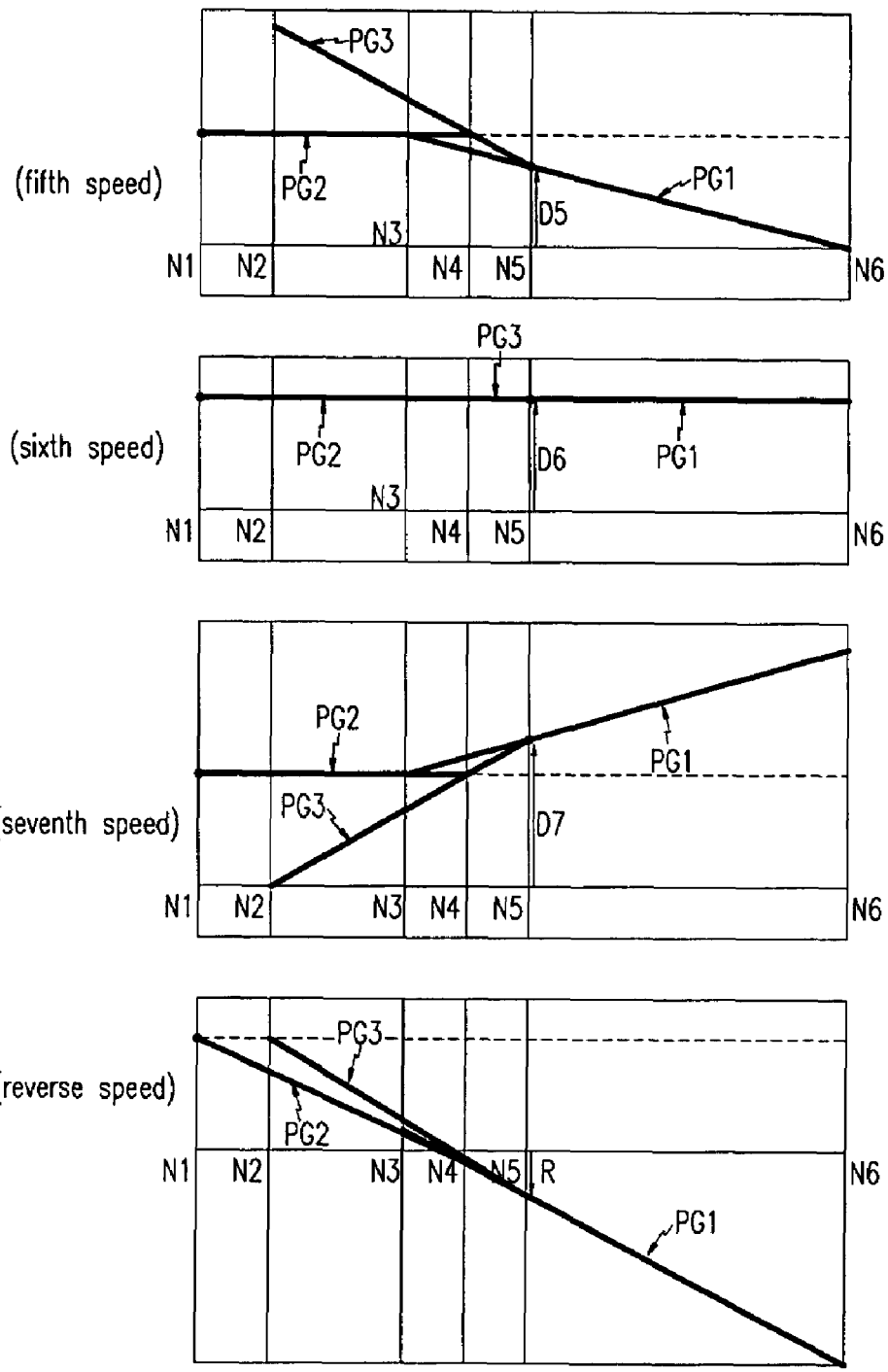
FIG. 4 is a speed diagram according to a lever analysis method for showing shifting processes from a fifth speed to a seventh speed and a reverse speed in a power train according to an embodiment of the present invention.

FIGS. 3 and 4 illustrate shifting processes in the power train according to an embodiment of the present invention. In the forward first speed, first brake B1 and one way clutch OWC operate. Then, a speed line is formed as illustrated in the first speed drawing of FIG. 3 through cooperation of first, second, and third planetary gear sets PG1, PG2, and PG3, while fourth node N4 and sixth node N6 operate as stationary elements and an input is performed through first node N1 corresponding to second sun gear S2. Accordingly, a speed of "D1" is output through fifth node N5, the output element, thereby achieving the forward first speed.

In the forward second speed, first brake B1 and third brake B3 operate. When the power train is shifted into the forward second speed from the forward first speed, operation of one way clutch OWC is cancelled and third brake B3 initiates operation. Then, a speed line is formed as illustrated in the second speed drawing of FIG. 3 through cooperation of first, second, and third planetary gear sets PG1, PG2, and PG3, while second node N2 and sixth node N6 operate as stationary elements and an input is performed through first node N1 corresponding to second sun gear S2. Accordingly, a speed of "D2" is output through fifth node N5, the output element, thereby achieving the forward second speed.

In the forward third speed, second clutch C2 and one way clutch OWC operate. when the power train is shifted into the forward third speed from the forward second speed, operation of first and third brakes B1 and B3 are cancelled, and second clutch C2 and one way clutch initiate operation. Then, a speed line is formed as illustrated in the third speed drawing of FIG. 3 through cooperation of the first, second, and third planetary gear sets PG1, PG2, and PG3, while fourth node N4 operates as a stationary element and an input is performed through first node N1 corresponding to second sun gear S2 and sixth node N6 corresponding to first sun gear S1 at the same time. Accordingly, a speed of "D3" is output through fifth node N5, the output element, thereby achieving the forward third speed.

In the forward fourth speed, third clutch C3 and first brake B1 operate. When the power train is shifted into the forward fourth speed from the third speed, operation of second clutch C2 and one way clutch OWC are cancelled, and third clutch C3 and first brake B1 initiate operation. Then, a speed line is formed as illustrated in the fourth speed drawing of FIG. 3 through cooperation of the first, second, and third planetary gear sets PG1, PG2, and PG3, while sixth node N6 operates as a stationary element and an input is performed through first node N1 corresponding to second sun gear S2 and second node N2 corresponding to third sun gear S3. Accordingly, a speed of "D4" is output through fifth node N5, the output element, thereby achieving the forward fourth speed.

In the forward fifth speed, first clutch C1 and first brake B1 operate. When the power train is shifted into the forward fifth speed from the fourth speed, operation of the third clutch C3 is cancelled and the first clutch C1 is controlled to operate. Then, an input is performed through first node N1 corresponding to second sun gear S2, and third node N3 corresponding to second planetary carrier PC2. Therefore, second planetary gear set PG2 rotates integrally, and sixth node N6 operates as a stationary element. A speed of "D5" is output through fifth node N5, the output element, as shown in the fifth speed drawing of FIG. 4, through cooperation of first, second, and third planetary gear sets PG1, PG2, and PG3, thereby achieving the forward fifth speed.

In the forward sixth speed, first clutch C1 and third clutch C3 operate. When the power train is shifted into the forward sixth speed from the fifth speed, operation of first brake B1 is cancelled and third clutch C3 initiates operation. Then, an input is performed through first node N1 corresponding to second sun gear S2, third node N3 corresponding to second planetary carrier PC2, and second node N2 corresponding to third sun gear S3. In this speed, there is no stationary element. Therefore, first, second, and third planetary gear sets PG1, PG2, and PG3 are in a direct coupling state, so that a speed of "D6" is output through fifth node N5, the output element, as shown in the sixth speed drawing of FIG. 4, thereby achieving the forward sixth speed.

In the forward seventh speed, first clutch C1 and third brake B3 operate. When the power train is shifted into the forward seventh speed from the sixth speed, operation of third clutch C3 is cancelled and third brake B3 initiates operation. Then, an input is performed simultaneously through first node N1 corresponding to second sun gear S2 and third node N3 corresponding to second planetary carrier PC2, so that second planetary gear set PG2 rotates integrally, and second node N2 corresponding to third sun gear S3 operates as a stationary element. Therefore, through cooperation of first, second, and third planetary gear sets PG1, PG2, and PG3, a speed line is formed as illustrated in the seventh speed drawing of FIG. 4. Accordingly, a speed of "D7" is output through fifth node N5, the output element, thereby achieving the forward seventh speed.

In the reverse speed, third clutch C3 and second brake B2 operate. Then, a speed line is formed as illustrated in the reverse speed drawing of FIG. 4 through cooperation of first, second, and third planetary gear sets PG1, PG2, and PG3, while fourth node N4 operates as a stationary element and an input is performed through first node N1 corresponding to second sun gear S2, and second node N2 corresponding to third sun gear S3. Accordingly, a speed of "R" is output through fifth node N5, the output element, thereby achieving the reverse speed.

Because a person ordinarily skilled in the art can easily obtain the speed line for each planetary gear set, a detailed explanation thereof will be omitted.

In the power train according to the embodiment of the present invention, a shift ratio of 4.829 is determined for the forward first speed, a shift ratio of 2.900 is determined for the forward second speed, a shift ratio of 2.139 is determined for the forward third speed, a shift ratio of 1.765 is determined for the forward fourth speed, a shift ratio of 1.352 is determined for the forward fifth speed, a shift ratio of 1.000 is determined for the forward sixth speed, and a shift ratio of 0.750 is determined for the forward seventh speed. Therefore, optimization of the shift ratio can be realized. In the present invention, the number of operating elements while shifting can be decreased, and the seven forward speeds can be easily realized. In addition, by forming the power train through assembling only the single-pinion planetary gear sets, improved endurance, productivity, and design freedom can be achieved, and performance of the automatic transmission can be improved.

Although embodiments of the present invention have been described in detail, it should be clearly understood that many variations and/or modifications of the basic inventive concepts described which may appear to those skilled in the art to fall within the spirit and scope of the present invention, as defined in the appended claims.

What is claimed is:

1. A power train of a 7-speed transmission for a vehicle, comprising:
   an input shaft;
   a transmission case;
   a first single-pinion planetary gear set, disposed on the input shaft and including a first ring gear fixedly connected to a second planetary carrier;
   a second single-pinion planetary gear set, disposed on the input shaft and including a second ring gear fixedly connected to a third planetary carrier;
   a third single-pinion planetary gear set, disposed on the input shaft and including a third ring gear fixedly connected to a first planetary carrier;
   a first sun gear selectively connected to the transmission case via a first brake;
   a second sun gear fixedly connected to the input shaft to always operate as an input element; and
   a third sun gear selectively connected to the transmission case via a third brake;
   wherein a first clutch selectively connects the second planetary carrier to the input shaft, a second brake and a one way clutch selectively connect the third planetary carrier to the transmission case, and the third ring gear is connected to an output shaft.

2. The power train of claim 1, wherein the first brake and the one way clutch operate in a first speed, the first brake and the third brake operate in a second speed, a second clutch and the one way clutch operate in a third speed, a third clutch and the first brake operate in a fourth speed, the first clutch and the first brake operate in a fifth speed, the first clutch and the third clutch operate in a sixth speed, the first clutch and the third brake operate in a seventh speed, and the third clutch and the second brake operate in a reverse speed.

3. The power train of claim 1, wherein a third clutch and the second and third brakes are disposed in a front portion of the inside of the transmission case, and the first clutch, a second clutch, and the first brake are disposed in a rear portion of the inside of the transmission case.

4. The power train of claim 1, wherein the one way clutch and the second brake are disposed in parallel within the transmission case, and are connected to the third planetary carrier.

* * * * *